(12) United States Patent
Liang

(10) Patent No.: US 10,228,772 B2
(45) Date of Patent: *Mar. 12, 2019

(54) REMOTE CONTROLLER

(71) Applicant: PixArt Imaging Inc., Hsin-Chu County (TW)

(72) Inventor: Chia-Cheun Liang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/893,151

(22) Filed: Feb. 9, 2018

(65) Prior Publication Data
US 2018/0164898 A1    Jun. 14, 2018

Related U.S. Application Data

(60) Continuation of application No. 15/667,987, filed on Aug. 3, 2017, which is a continuation of application
(Continued)

(30) Foreign Application Priority Data

Jan. 29, 2013 (TW) .............................. 102103386 A

(51) Int. Cl.
*G06K 9/46* (2006.01)
*G06F 3/03* (2006.01)
(Continued)

(52) U.S. Cl.
CPC ............ *G06F 3/0325* (2013.01); *G06F 3/033* (2013.01); *G06F 3/0304* (2013.01);
(Continued)

(58) Field of Classification Search
CPC ...... G06F 3/0325; G06F 3/0346; G06F 3/041; G06F 3/033; G06F 3/0304; G06K 9/4661;
(Continued)

(56) References Cited

U.S. PATENT DOCUMENTS 9,323,347 B2 *  4/2016  Liang .................... G06F 3/0304
9,684,386 B2 *  6/2017  Liang ...................... G06F 3/033
(Continued)

FOREIGN PATENT DOCUMENTS

CN         101196996 A        6/2008
CN         101714209 A        5/2010
(Continued)

*Primary Examiner* — Jonathan A Boyd
(74) *Attorney, Agent, or Firm* — Hauptman Ham, LLP

(57) ABSTRACT

There is provided an optical pointing system including at least one reference beacon, an image sensor, a storage unit and a processing unit. The image sensor is configured to capture an image frame containing a beacon image associated with the at least one reference beacon. The storage unit is configured to save image data of at least one object image in the image frame. The processing unit is configured to sequentially process every pixel of the image frame for identifying the object image and real-timely remove or merge the image data, saved in the storage unit, associated with two object images within a pixel range of the image frame thereby reducing the used memory space.

8 Claims, 5 Drawing Sheets

Related U.S. Application Data

No. 15/077,276, filed on Mar. 22, 2016, now Pat. No. 9,766,717, which is a division of application No. 14/094,988, filed on Dec. 3, 2013, now Pat. No. 9,323,347.

(51) Int. Cl.

| | |
|---|---|
| *G06F 3/033* | (2013.01) |
| *G06K 9/52* | (2006.01) |
| *G06K 9/62* | (2006.01) |
| *G06T 7/60* | (2017.01) |
| *G06T 7/00* | (2017.01) |
| *G06F 3/0346* | (2013.01) |
| *G06F 3/041* | (2006.01) |

(52) U.S. Cl.
CPC ............ *G06F 3/0346* (2013.01); *G06F 3/041* (2013.01); *G06K 9/52* (2013.01); *G06K 9/6201* (2013.01); *G06T 7/0042* (2013.01); *G06T 7/60* (2013.01); *G06K 9/46* (2013.01); *G06K 9/4661* (2013.01); *G06K 2009/4666* (2013.01)

(58) Field of Classification Search
CPC .................. G06K 9/6201; G06K 9/52; G06K 2009/4666; G06K 9/46; G06T 7/0042; G06T 7/60
See application file for complete search history.

(56) References Cited

U.S. PATENT DOCUMENTS

| | | |
|---|---|---|
| 2001/0031072 A1 | 10/2001 | Dobashi et al. |
| 2006/0245649 A1 | 11/2006 | Chen et al. |
| 2006/0245652 A1 | 11/2006 | Chen |
| 2008/0253656 A1 | 10/2008 | Schwartzberg et al. |
| 2010/0086175 A1 | 4/2010 | Yokono et al. |
| 2011/0176733 A1 | 7/2011 | Ch Ien |
| 2012/0183210 A1 | 7/2012 | Zheng et al. |
| 2012/0201422 A1 | 8/2012 | Tsukamoto |

FOREIGN PATENT DOCUMENTS

| | | |
|---|---|---|
| CN | 102068281 A | 5/2011 |
| CN | 102131050 A | 7/2011 |
| TW | M418339 U | 12/2011 |

\* cited by examiner

REMOTE CONTROLLER

CROSS REFERENCE TO RELATED APPLICATION

This application is a continuation application of U.S. application Ser. No. 15/667,987, filed on Aug. 3, 2017, which is a continuation application of U.S. application Ser. No. 15/077,276, filed on Mar. 22, 2016, now U.S. Pat. No. 9,766,717, which is a divisional application of U.S. application Ser. No. 14/094,988, filed on Dec. 3, 2013, now U.S. Pat. No. 9,323,347, the disclosures of which are hereby incorporated by reference herein in their entirety. This application claims the priority benefit of Taiwan Patent Application Serial Number 102103386, filed on Jan. 29, 2013, the full disclosure of which is incorporated herein by reference.

BACKGROUND

1. Field of the Disclosure

This disclosure generally relates to a human-machine interaction system and, more particularly, to an optical pointing system.

2. Description of the Related Art

The conventional remote controller includes a plurality of press buttons so that a user can press at least one press button thereon to generate a control signal so as to correspondingly control a home appliance. However, the press buttons have limited control functions and thus the pointing system for controlling home appliances by using the images captured by an image sensor is developed.

A pointing system generally includes a plurality of system reference points for being captured by the image sensor, and a processing unit is configured to calculate the position variation, which will be served as a displacement, of reference point images according to the captured images. The displacement is used to correspondingly control a cursor motion.

When receiving an image frame, the processing unit sequentially detects every pixel in the image frame so as to identify whether an object image exists in the image frame or not, and the pixel information associated with the object image is temporarily saved in a buffer. Referring to FIG. 1, for example three object images 91-93 are contained in an image frame 90, wherein the object images 91 and 92 indicate the system reference points and the object image 93 indicates the ambient noise. The processing unit saves the information of all object images 91-93 into the buffer at first and then performs the post-processing, e.g. identifying which of the object images 91-93 is caused by ambient noises.

In the above method, as the data associated with all object images in one image frame is all saved at first, a large memory space will be used such that the buffer having a large memory space is required or the memory space may not be enough in some operating environments, e.g. having many ambient light sources.

Accordingly, the present disclosure further provides an optical pointing device that may real-timely release the occupied memory space of the buffer.

SUMMARY

The present disclosure provides an optical pointing system that may reduce the occupied memory space of the buffer.

The present disclosure provides a remote controller including an image sensor, a storage unit and a processing unit. The image sensor is configured to capture an image frame containing at least one object image. The storage unit is configured to store image data of the at least one object image in the image frame. The processing unit is configured to sequentially process every pixel of the image frame captured within a scan period for identifying the at least one object image, and when two object images simultaneously appear within a clearance range of the image frame, remove image data, which is stored in the storage unit, associated with the two object images within the clearance range, wherein the clearance range is a pixel region extending outward from an edge of the at least one object image to a pixel area smaller than the image frame, and the two object images are separated from each other in the image frame.

The present disclosure further provides a remote controller including an image sensor, a storage unit and a processing unit. The image sensor is configured to capture an image frame containing at least one object image. The storage unit is configured to store image data of the at least one object image in the image frame. The processing unit is configured to sequentially process every pixel of the image frame captured within a scan period for identifying the at least one object image, when a first object image is recognized in the image frame, determine a clearance region in the image frame surrounding the first object image, wherein the clearance region is a pixel region extending outward from an edge of the first object image to a pixel area smaller than the image frame, and when a second object image is recognized within the clearance range of the image frame, remove image data, which is stored in the storage unit, associated with the first and second object images within the clearance range, wherein the first and second object images are two object images in the image frame and separated from each other.

The present disclosure further provides a remote controller including an image sensor, a storage unit and a processing unit. The image sensor is configured to capture an image frame containing at least one object image. The storage unit is configured to store image data of the at least one object image in the image frame. The processing unit is configured to sequentially process every pixel of the image frame captured within a scan period for identifying the at least one object image, and when a plurality of object images simultaneously appear within a combinable range, which is determined around the at least one object image, of the image frame, merge image data, which is stored in the storage unit, associated with the plurality of object images within the combinable range.

In one aspect, when an intensity of every pixel of a pixel region is larger than or equal to an intensity threshold, an accumulated pixel area of a pixel region is larger than or equal to an area threshold and/or a pixel region matches a predetermined feature, the processing unit identifies the pixel region as an object image, wherein the object image may include the beacon image and ambient light images, and the pixel region may be formed by a plurality of adjacent pixels.

In one aspect, the clearance range and the combinable range extend outward from a center, a gravity center or an edge of an object image.

In one aspect, the clearance range and the combinable range may be a fixed predetermined pixel range or determined according to system parameters including a disposed distance between two reference beacons, an image capturing angle of the image sensor and an operable distance of the remote controller.

In the optical pointing system according to the embodiment of the present disclosure, as the processing unit may real-timely remove or merge object image data in a predetermined pixel range within a scan period, a part of memory space of the storage unit is released thereby saving the system resources.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
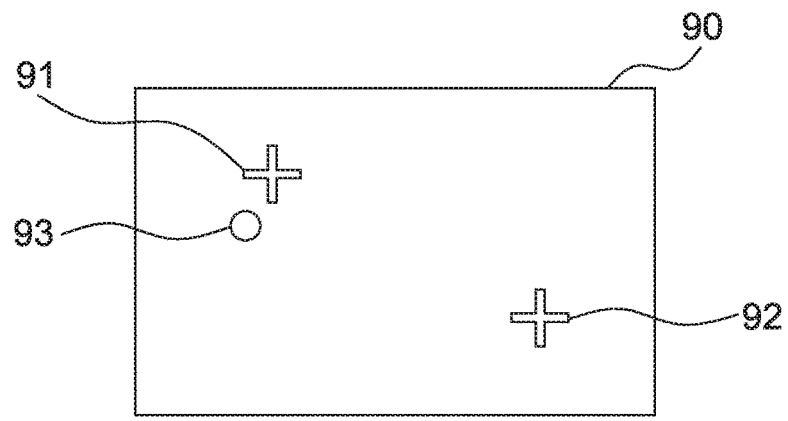
FIG. 1 shows a schematic diagram of an image frame captured by the image sensor of a pointing system.
Figure 2:
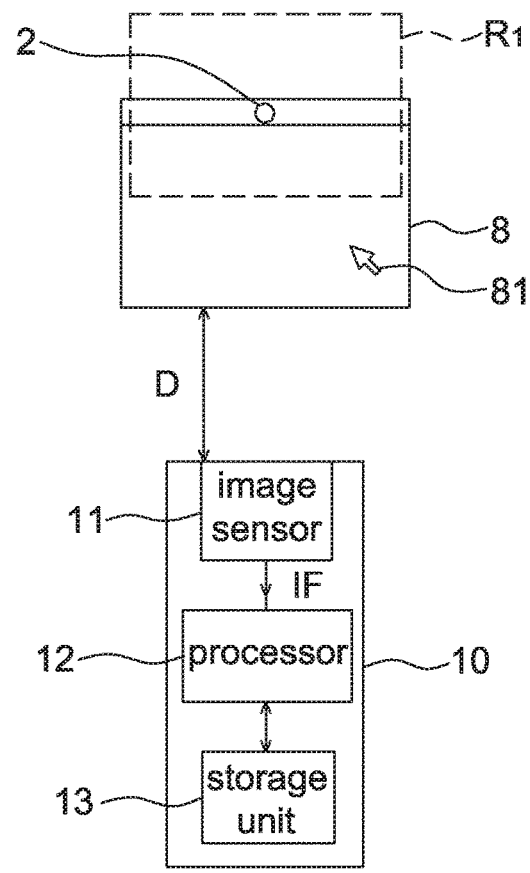
FIG. 2 shows a schematic diagram of the optical pointing system according to an embodiment of the present disclosure.

Referring to FIG. 2, it shows a schematic diagram of the optical pointing device according to an embodiment of the present disclosure, which includes a remote controller 10 and at least one reference beacon (e.g. one reference beacon 2 is shown herein). In this embodiment, the reference beacon 2 may be a light emitting diode, a laser diode, an active dot light source or may be formed by arranging a plurality of active dot light sources, and the reference beacon 2 preferably emits identifiable spectrum, e.g. infrared light. The remote controller 10 may be a remote controller for home appliances on which a plurality of press buttons may be disposed for being pressed by a user. The user may control the operation, e.g. ON/OFF and parameters output, of a home appliance through the remote controller 10. For example in one embodiment, the user may use the remote controller 10 to capture an image frame in which a beacon image associated with the reference beacon 2 is contained, and to control a display device 8 to show the motion of a cursor 81 according to the variation of the beacon image in the image frame. In other embodiments, the remote controller 10 may be a portable electronic device.

The remote controller 10 includes an image sensor 11, a processing unit 12 and a storage unit 13. The image sensor 11 is preferably an active image sensor, e.g. a CMOS image sensor, and configured to capture an image frame IF containing a beacon image associated with the at least one reference beacon. For example referring to FIG. 3, it shows an image frame IF captured by the image sensor 11, wherein the image frame IF contains a beacon image $I_2$.

The memory unit 13 may be a buffer configured to save image data of at least one object image in the image frame IF, wherein the image data may include parameters, e.g. the intensity, position, size and so on, of the at least one object image. In one embodiment, the storage unit 13 may have a plurality of storage blocks and the image data associated with different object images may be respectively saved in different storage blocks.

The processing unit 12 may be a digital signal processor (DSP) and is configured to sequentially process every pixel of the image frame IF within a scan period for identifying the at least one object image, wherein the scan period may be referred to a period sequentially detecting every pixel of the image frame IF. For example in FIG. 3, within one scan period, the top left first pixel $P_{1,1}$ is detected at first and then other pixels in the first row $P_{1,2}$, $P_{1,3}$ to $P_{1,m}$ are detected sequentially, and then pixels in the second row $P_{2,1}$ to $P_{2,m}$ are detected sequentially, and finally pixels in the last row $P_{n,1}$ to $P_{n,m}$ are detected sequentially, wherein n and m are positive integers whose values may be determined according to the sensing array size of the image sensor 11. In addition, within the scan period a first pixel column may be scanned at first and then other pixel columns are scanned sequentially. In this embodiment, the at least one object image may include the beacon image $I_2$ and ambient light images (e.g. $O_1$ and $O_2$), wherein said ambient light may be referred to other active light sources in the operating environment (not the reference beacon) or reflected light sources formed by reflecting the light emitted by the reference beacon. Accordingly, when an intensity of every pixel of a pixel region is larger than or equal to an intensity threshold, an accumulated pixel area (e.g. number of pixels accumulated in the scan period having the intensity larger than or equal to the intensity threshold) of a pixel region is larger than or equal to an area threshold and/or a pixel region matches a predetermined feature, the processing unit 12 identifies the pixel region as an object image, wherein said pixel region may be formed by one or a plurality of adjacent pixels. Said predetermined feature may be the modulation frequency, shape or other features configured to distinguish the beacon image. It is appreciated that generally noises are contained in the image frame IF and thus even though the intensity of a pixel region is larger than or equal to an intensity threshold, the pixel region may be caused by noises. Therefore, preferably a pixel region is identified as an object image when an accumulated pixel area is larger than an area threshold at the same time. For example in FIG. 3, the intensity of the pixel $P_{4,1}$ is larger than the intensity threshold, but the area thereof is too small (e.g. one pixel region shown herein), and thus the pixel $P_{4,1}$ is not identified as an object image.

In this embodiment, when the processing unit 12 recognizes an object image, image data associated with the recognized object image is temporarily saved in the storage unit 13. Next, the processing unit 12 identifies whether two object images appear within one scan period. When two object images are recognized, an image distance between the two object images is calculated so as to determine whether to remove or merge the image data, saved in the storage unit 13, associated with the two object images. For example referring to FIG. 3, when the processing unit 12 identifies a current object image $O_2$ (or $I_2$) within a scan period and a previous object image $O_1$ (or $O_2$) exists in the image frame IF, the processing unit 12 calculates an image distance $d_1$ (or $d_2$) between the current object image $O_2$ (or $I_2$) and the previous object image $O_1$ (or $O_2$) to accordingly release a part of the image data associated with the at least one object image. It is appreciated that shapes and sizes of the object images in FIG. 3 are only intended to illustrate but not to limit the present disclosure.

In the present disclosure, the processing unit 12 may remove or merge object images that are within a predetermined pixel range so as to reduce the used memory space.

Figure 3:
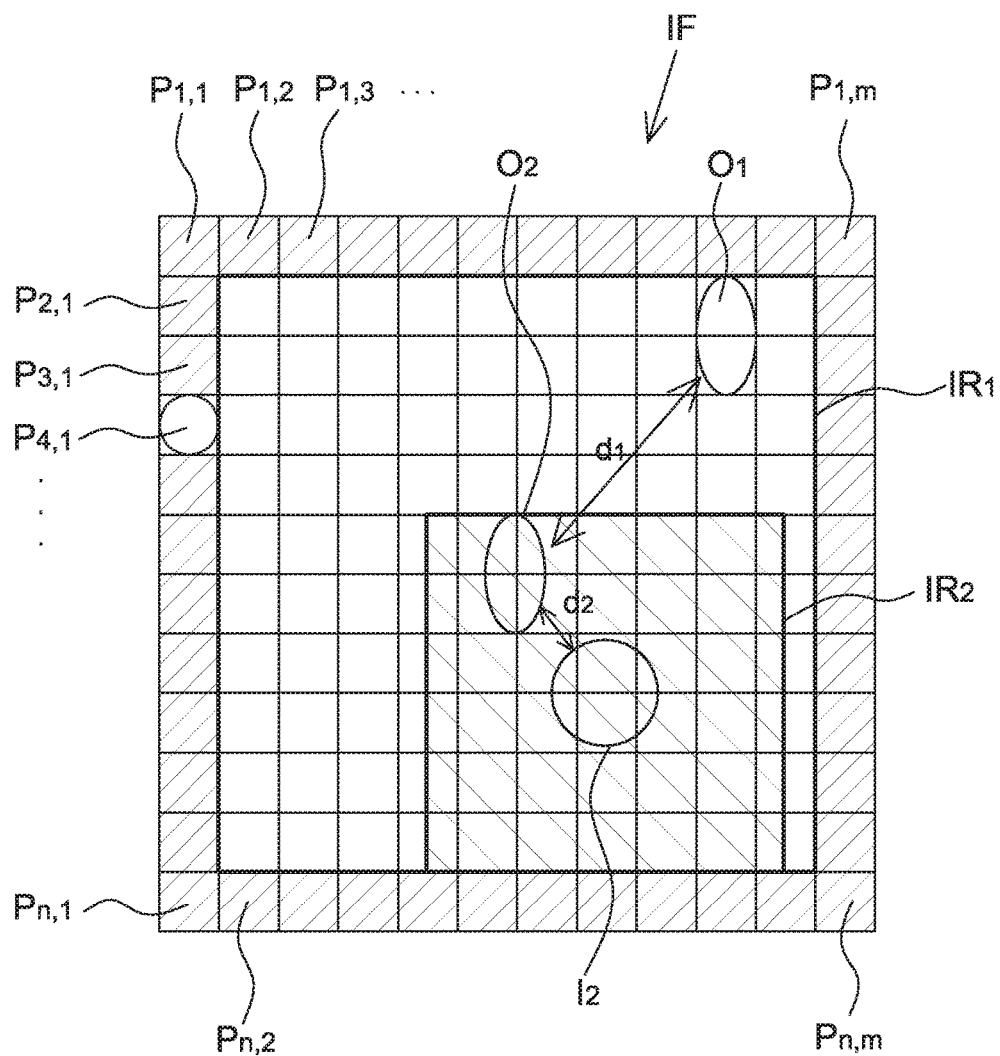
FIG. 3 shows a schematic diagram of an image frame captured by the image sensor of the optical pointing system of FIG. 2.
Figure 4A:
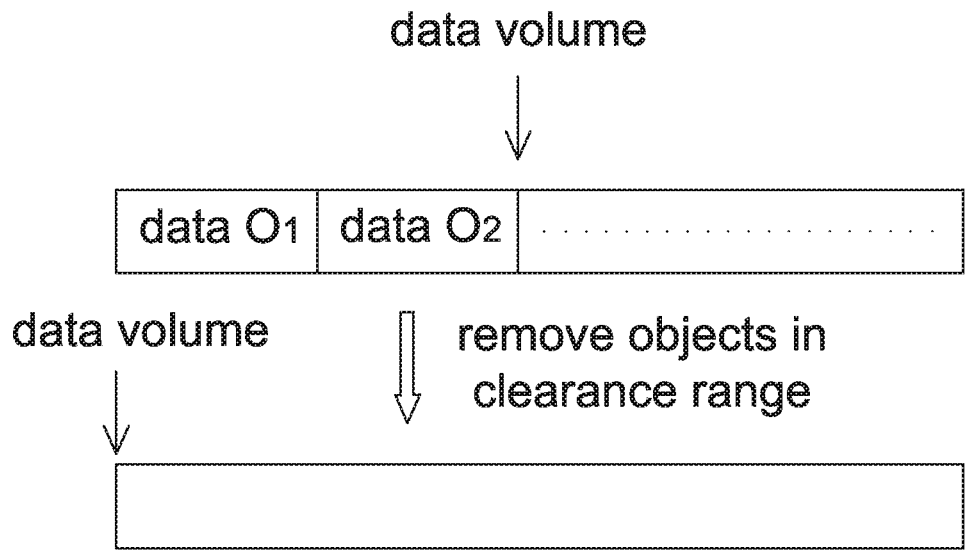
FIGS. 4A and 4B show schematic diagrams of the variation of image data saved in the storage unit of the optical pointing system according to the embodiment of the present disclosure.

Referring to FIGS. 2, 3 and 4A, an embodiment of removing the image data, which is saved in the storage unit 13, associated with the object image is illustrated hereinafter. Herein, it is assumed that the optical pointing system includes a single reference beacon 2 and the image frame IF captured by the image sensor 11 contains ambient light images $O_1$ and $O_2$. The processing unit 12 is configured to sequentially process every pixel of the image frame IF within a scan period for identifying the at least one object image. When two object images (e.g. $O_1$ and $O_2$) simultaneously appear in a clearance range $IR_1$ of the image frame IF within the scan period, the image data, saved in the storage unit 13, associated with the two object images within the clearance range $IR_1$ is removed.

Before the shipment of the optical pointing system of the present disclosure, an operable range D of the remote controller is previously set, such as 10 meters, but not limited to. It is also assumed that there is no other beacon image existing within a space range $R_1$ (as FIG. 2) around the reference beacon 2. Accordingly, when the image sensor 11 captures an image frame IF in the operable range D, a clearance range $IR_1$ in the image frame IF may be calculated according to the operable range D and the space range $R_1$; that is, the clearance range $IR_1$ may be a fixed predetermined pixel range set previously, and the clearance range $IR_1$ is a mapping of the space range $R_1$.

When receiving an image frame IF, the processing unit 12 sequentially processes every pixel $P_{1,1}$ to $P_{n,m}$. When one object image $O_1$ is recognized, image data associated with the object image $O_1$ is temporarily saved in the storage unit 13 as the data $O_1$ of FIG. 4A. Next, other pixels are processed and when a current object image $O_2$ is recognized, the processing unit 12 saves image data associated with current object image $O_2$ in the storage unit 13 as the data $O_2$ of FIG. 4A. As a previous object image $O_1$ exists in the image frame IF herein, the processing unit 12 then calculates an image distance $d_1$ between the current object image $O_2$ and the previous object image $O_1$, and when the image distance $d_1$ is smaller than or equal to the clearance range $IR_1$, the image data (as shown in FIG. 4A), saved in the storage unit 13, associated with the current object image $O_2$ and the previous object image $O_1$ is removed. In this embodiment, the image distance $d_1$ may be a distance between centers, gravity centers or edges of the current object image $O_2$ and the previous object image $O_1$.

In another embodiment, every time when an object image is recognized (e.g. the object image $O_2$ of FIG. 3), the processing unit 12 may immediately determine the clearance range $IR_1$ around the recognized object image, and when another object image (e.g. the object image $O_1$ of FIG. 3) is recognized within the clearance range $IR_1$, the image data, saved in the storage unit 13, associated with the two object images (i.e. $O_1$ and $O_2$) within the clearance range $IR_1$ both removed. In this embodiment, the clearance range $IR_1$ is a pixel range extending outward from a center, a gravity center, an edge or other positions for indicating the image position, of the at least one object image. For example, FIG. 3 shows the clearance range $IR_1$ is formed by extending outward from a center of the object image $O_2$.

Figure 4B:
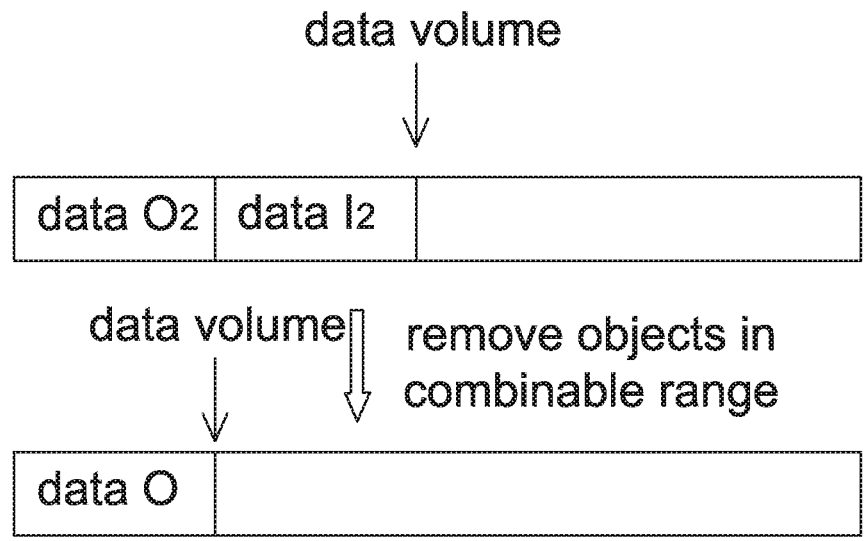

Referring to FIGS. 2, 3 and 4B, an embodiment of merging the image data, which is saved in the storage unit 13, associated with the object image is illustrated hereinafter. Herein, it is assumed that the optical pointing system includes a single reference beacon 2, and the image frame IF captured by the image sensor 11 contains a beacon image $I_2$ and an ambient light image $O_2$. The processing unit 12 is configured to sequentially process every pixel of the image frame IF within a scan period for identifying the at least one object image. When a plurality of object images (e.g. $O_2$ and $I_2$) simultaneously appear in a combinable range $IR_2$ of the image frame IF within the scan period, the image data, saved in the storage unit 13, associated with the plurality of object images within the combinable range $IR_2$ is merged.

Before the shipment of the optical pointing system of the present disclosure, the combinable range $IR_2$ is previously set. In operation, the object images within the combinable range $IR_2$ are merged to be treated as one single object image.

When receiving an image frame IF, the processing unit 12 sequentially processes every pixel $P_{1,1}$ to $P_{n,m}$. When one object image $O_2$ is recognized, image data associated with the object image $O_2$ is temporarily saved in the storage unit 13 as the data $O_2$ of FIG. 4B. Next, other pixels are processed and when a current object image $I_2$ is recognized, the processing unit 12 saves image data associated with the current object image $I_2$ in the storage unit 13 as the data $I_2$ of FIG. 4B. As a previous object image $O_2$ exists in the image frame IF herein, the processing unit 12 then calculates an image distance $d_2$ between the current object image $I_2$ and the previous object image $O_2$, and when the image distance $d_2$ is smaller than or equal to the combinable range $IR_2$, the image data, saved in the storage unit 13, associated with the current object image $I_2$ and the previous object image $O_2$ is merged (e.g. FIG. 4B showing the data $O_2$ and data $I_2$ being merged as data O). In this embodiment, the image distance $d_2$ may be a distance between centers, gravity centers or edges of the current object image $I_2$ and the previous object image $O_2$.

In another embodiment, every time when an object image is recognized (e.g. the object image $I_2$ of FIG. 3), the processing unit 12 may immediately determine the combinable range $IR_2$ around the recognized object image, and when another object image (e.g. the object image $O_2$ of FIG. 3) is recognized within the combinable range $IR_2$, the image data, saved in the storage unit 13, associated with the two object images within the combinable range $IR_2$ is merged. It should be mentioned that although FIG. 3 shows that a combinable range $IR_2$ contains only two object images, it is appreciated that when more than two object images are contained within the combinable range $IR_2$, the more than two object images may also be merged as one single object image. The combinable range $IR_2$ is a pixel range extending outward from a center, a gravity center, an edge or other positions for indicating the image position of the at least one object image. For example, FIG. 3 shows the combinable range $IR_2$ is formed by extending from a center of the object image $I_2$.

Figure 5A:
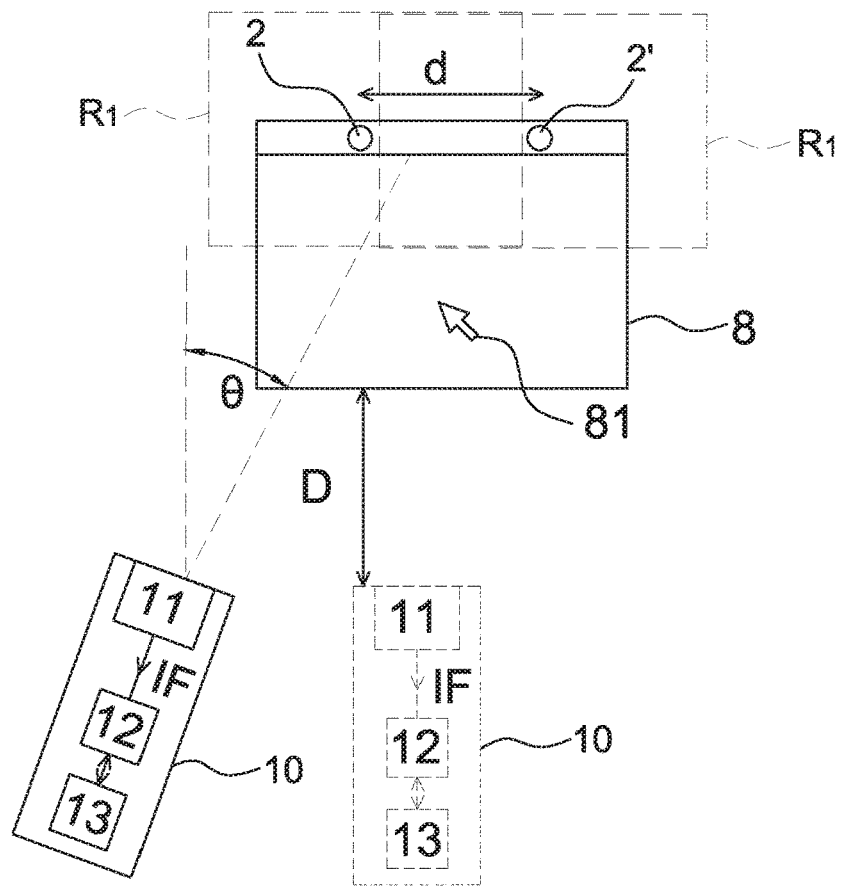
FIG. 5A shows a schematic diagram of the optical pointing system according to another embodiment of the present disclosure.
Figure 5B:
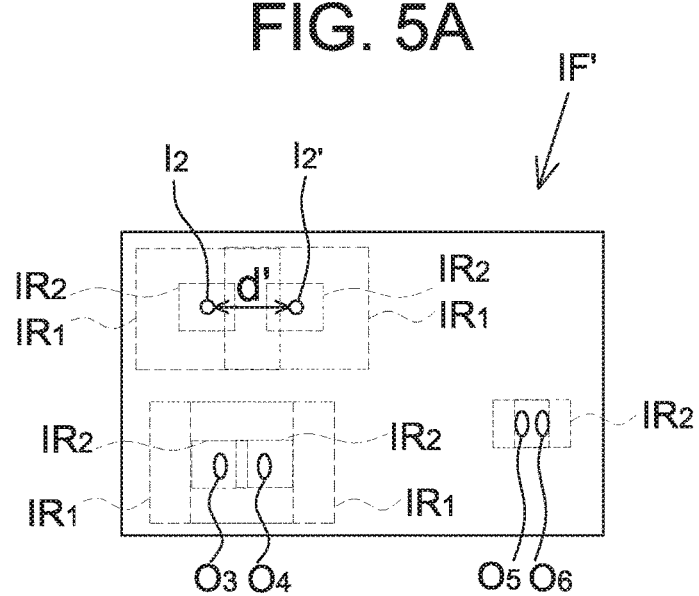
FIG. 5B shows a schematic diagram of an image frame captured by the image sensor of the optical pointing system of FIG. 5A.

In another embodiment, it is assumed that the optical pointing system includes two reference beacons, and the processing unit 12 may determine the clearance range $IR_1$ and the combinable range $IR_2$ according to the system parameter. For example referring to FIGS. 5A and 5B, FIG. 5B shows a schematic diagram of an image frame IF' captured by the image sensor 11. Two reference beacons 2 and 2' are separated by a disposed distance d, and an operable distance of the remote controller 10 is assumed to be D. The image frame IF' captured by the image sensor 11 may contain two beacon images $I_2$ and $I_2'$. In addition, other object images $O_3$ and $O_4$ as well as $O_5$ and $O_6$ are shown in FIG. 5B for illustration. It is assumed that an image distance between the two beacon images $I_2$, $I_2'$ is d' and there is no other object image existing within the range d'. Therefore, the clearance range $IR_1$ of the present disclosure may be set as equal to or slightly smaller than the image distance d'. However, as the image distance d' changes with system parameters including the disposed distance d, the operable distance D (e.g. 1-10 meters), an image capturing angle θ of the image sensor 11 and so on, the processing unit 12 may calculate the clearance range $IR_1$ according to the system parameters. The combinable range $IR_2$ may be set as a ratio or an offset of the clearance range $IR_1$. In another embodiment, the clearance range $IR_1$ and the combinable range $IR_2$ may be a fixed predetermined pixel range set previously. In addition, besides the method of determining the clearance range $IR_1$ and the combinable range $IR_2$, other details are similar to FIG. 3 and corresponding descriptions thereof and thus they are not repeated herein.

In other words, the clearance range $IR_1$ and the combinable range $IR_2$ according to the embodiment of the present disclosure may be fixed predetermined pixel ranges or determined according to the system parameters, wherein the system parameters may include a disposed distance between reference beacons, an image capturing angle of the image sensor and an operable distance. For example, it is assumed that the operable distance is 1-10 meters, and the distance (e.g. d') between two beacon images in the captured image frames associated with different image capturing angles θ within the operable distance may be previously measured, and the image capturing angle θ may be real-timely calculated during operation. In this manner, after the processing unit 12 obtains the distance between beacon images and the image capturing angle θ of the image sensor according to the image frame, the actual distance between the remote controller 10 and the reference beacons 2, 2' may be obtained by using a lookup table or the algorithm to accordingly determine the clearance range $IR_1$ and the combinable range $IR_2$.

Figure 6:
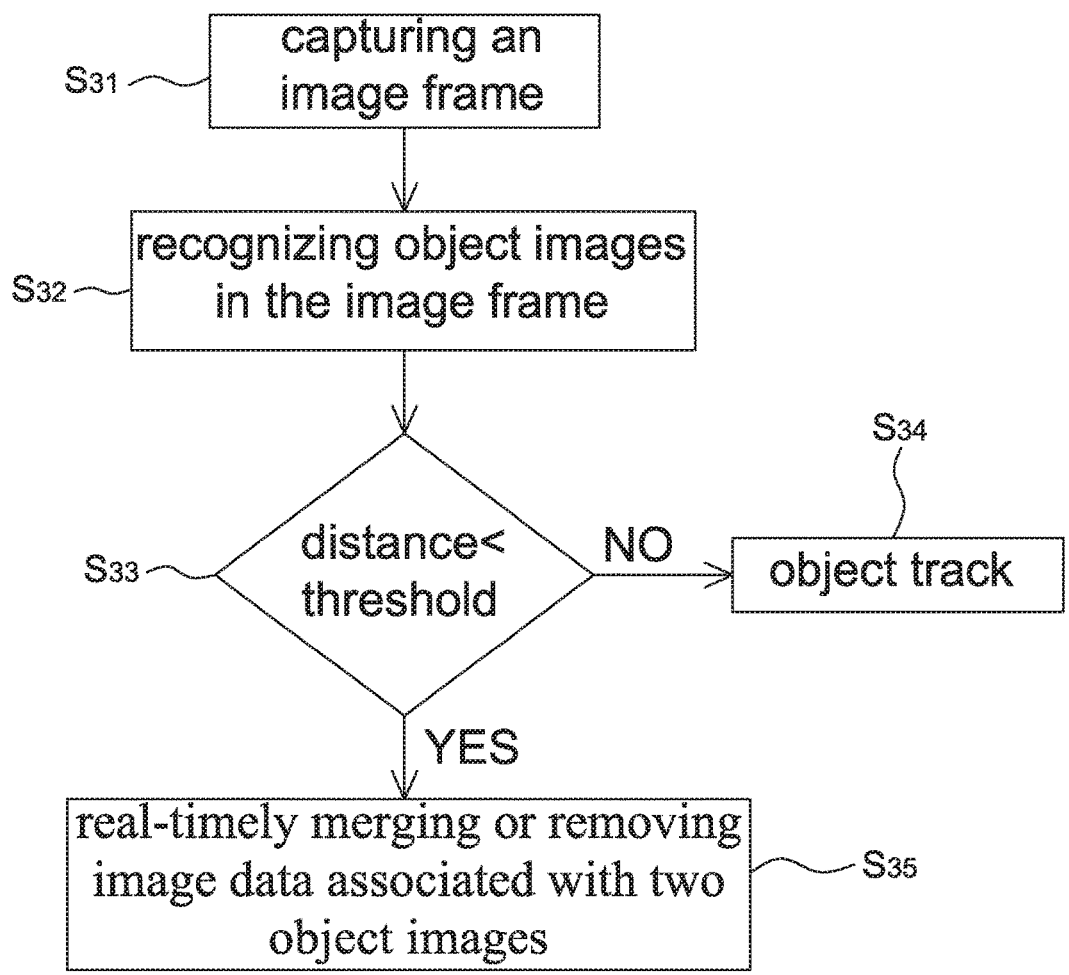
FIG. 6 shows a flow chart of the operating method of the optical pointing system according to the embodiment of the present disclosure.

Referring to FIG. 6, it shows a flow chart of the operating method of the optical pointing system according to the embodiment of the present disclosure, which includes the steps of: capturing an image frame (Step $S_{31}$); recognizing object images in the image frame (Step $S_{32}$); comparing an image distance with a distance threshold (Step $S_{33}$); performing object tracking when the image distance is larger than the distance threshold (Step $S_{34}$); and merging or removing image data associated with two object images when the image distance is smaller than or equal to the distance threshold (Step $S_{35}$); wherein the distance threshold may include the aforementioned clearance range (e.g. the first threshold) and/or combinable range (e.g. the second threshold). Referring to FIGS. 2-5B, the operating method of this embodiment is illustrated hereinafter.

Step $S_{31}$: The image sensor 11 captures an image frame (e.g. FIG. 3 or 5B) to be sent to the processing unit 12.

Step $S_{32}$: The processing unit 12 performs the recognition of object image according to the pixel intensity, the accumulated pixel area and the predetermined feature of a pixel region of adjacent pixels, e.g. recognizing the object images $O_1$, $O_2$, $I_2$ of FIG. 3 and the object images $I_2$, $I_2'$, $O_3$-$O_6$ of FIG. 5B, wherein the method of recognizing the object image is well known, and the present disclosure is to merge or remove the recognized object images.

Step $S_{33}$: The processing unit 12 then compares the image distance between the object images $O_1$ and $O_2$ (e.g. assuming only object images $O_1$ and $O_2$ being included) or the image distance between the object images $O_2$ and $I_2$ (e.g. assuming only object images $O_2$ and $I_2$ being included) with the distance threshold, wherein the image distances $d_1$ and $d_2$ may be distances between centers, gravity centers, edges or other positions for indicating the object image position of the two object images.

Step $S_{34}$: When the processing unit 12 identifies that the image distance is larger than a first threshold (e.g. the clearance range $IR_1$), the two object images (e.g. object images $I_2$ and $I_2'$ of FIG. 5B) are treated as two different objects. The processing unit 12 then performs the object tracking on the two objects, e.g. calculating object coordinates according to the image frame or calculating an object displacement according to the image frame and a previous image frame, wherein methods of calculating the object coordinate and the object displacement are well known and thus details thereof are not described herein.

Step $S_{35}$: When the processing unit 12 identifies that the image distance is smaller than or equal to a first threshold and larger than a second threshold (e.g. the combinable range $IR_2$), image data associated with two object images (e.g. the object images $O_3$ and $O_4$ of FIG. 5B) and saved in the storage unit 13 is removed. When the processing unit 12 identifies that the image distance is smaller than or equal to the second threshold, image data associated with two object images (e.g. the object images $O_5$ and $O_6$ of FIG. 5B) and saved in the storage unit 13 is merged thereby reducing the occupied memory space. When the object image within a predetermined pixel range is removed or merged, the processing unit 12 then performs the object tracking according to the left object image(s) and/or the merged object image(s). In this embodiment, the second threshold may be smaller than the first threshold.

In the present disclosure, the step of removing object data and the step of merging object data may be performed independently or simultaneously.

It should be mentioned that although one and two reference beacons are used to illustrate in the embodiment of the present disclosure, it is not to limit the present disclosure. The number of the reference beacons may be determined according to the algorithm for calculating the displacement and coordinate without particular limitation. The present disclosure is to release at least a part of memory space associated with a plurality of object images when the remote controller 10 recognizes the plurality of object images appear within a clearance range or a combinable range thereby reducing the occupied memory space.

In addition, although FIGS. 4A and 4B show that the image data are saved continuously, they are only intended to illustrate but not to limit the storage method of the image data in the storage unit 13.

As mentioned above, the conventional pointing device temporarily saves all object images that are recognized at first and then identifies, after the scanning ended, whether the saved object images are associated with the system reference beacons such that a larger memory space can be occupied in operation. Therefore, the present disclosure further provides an optical pointing device (FIGS. 2 and 5A) that may release the memory space for recording ambient light data during scanning the image frame thereby reducing the used memory space.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A remote controller, comprising:
an image sensor configured to capture an image frame containing at least one object image;
a storage unit configured to store image data of the at least one object image in the image frame; and
a processing unit configured to
sequentially process every pixel of the image frame captured within a scan period for identifying the at least one object image, and
when a plurality of object images simultaneously appear within a combinable range, which is determined around the at least one object image, of the image frame, merge image data, which is stored in the storage unit, associated with the plurality of object images within the combinable range.

2. The remote controller as claimed in claim 1, wherein when an intensity of every pixel of a pixel region is larger than or equal to an intensity threshold and at least one of
(i) a pixel area of the pixel region being larger than or equal to an area threshold, and
(ii) the pixel region matching a predetermined feature, is true,
the processing unit is configured to identify the pixel region as the at least one object image.

3. The remote controller as claimed in claim 1, wherein the combinable range is a fixed predetermined pixel range.

4. The remote controller as claimed in claim 1, wherein the combinable range is determined according to system parameters, which are selected from the group consisting of a disposed distance between reference beacons, an image capturing angle of the image sensor and an operable distance.

5. The remote controller as claimed in claim 1, wherein the combinable range extends outward from a center, a gravity center or an edge of the at least one object image.

6. The remote controller as claimed in claim 1, wherein the combinable range is a pixel region extending outward from an edge of the at least one object image to a pixel area smaller than the image frame.

7. The remote controller as claimed in claim 1, wherein the plurality of object images are separated from each other in the image frame.

8. The remote controller as claimed in claim 1, wherein the at least one object image comprises a reference beacon image and an ambient light image.

* * * * *